Patented July 13, 1948

2,445,052

UNITED STATES PATENT OFFICE 2,445,052

HYDRAULIC CEMENT

Oswald T. Zimmerman, Durham, N. H., assignor to Kerr Manufacturing Co., a corporation of Michigan No Drawing. Application February 1, 1943, Serial No. 474,362

10 Claims. (Cl. 106—85)

The invention relates to hydraulic cements.

The principal object of the invention is to obtain new hydraulic cement compositions having high strength and low solubility in fresh water, sea water and soil solutions.

My new cement compositions are composed essentially of the oxides of Al, Ca and Sr in certain ratios. They are produced in the usual manner by heating the oxides in the desired proportions to a high temperature, usually to the point of fusion or almost to the point of fusion, thereby forming a clinker which is then ground to a finely divided state in which form it is capable of setting to a hard mass upon the addition of water alone. Instead of using the oxides, other compounds of Sr, Al and Ca such as the carbonates which are capable of forming the oxides at high temperatures may be used.

In the present state of the art, one type of hydraulic cement, known as Portland cement, is composed principally of the oxides of calcium and silicon; and another type, known as aluminous cement, is composed principally of the oxides of calcium and aluminum. The latter type of cement is characterized by relatively high strength and low solubility.

Because strontium oxide is chemically similar to calcium oxide, it has been realized for some time that it should be possible to replace the calcium oxide in a cement composition with an equivalent quantity of strontium oxide and obtain products which would have hydraulic properties. However, it has also been generally believed that the presence of strontium in a cement would result in a highly soluble, and therefore inferior, product, for strontium hydroxide, which forms during the setting of a strontium-containing cement is much more soluble than calcium hydroxide, which forms during the setting of a calcium-containing cement. This opinion has been verified by experiment—when calcium oxide is replaced by an equivalent quantity of strontium oxide, the products are not only more soluble than the corresponding products without strontium, but they are also generally inferior in strength.

However, I have discovered that when $Al_2O_3$ is combined with both CaO and SrO in proper proportions, the cements so formed are both stronger and less soluble than the corresponding cements without strontium and also possess other desirable properties. While the ratio of these three ingredients may be varied within wide ranges in accordance with the invention, I have found that the optimum proportions for high strength correspond to the new compound mono-calcium, mono-strontium dialuminate — $CaO.SrO.2Al_2O_3$. This compound is characterized by extremely high strength, low solubility, high resistance to sulfate-containing water, white color, good adhesion, volume constancy and other properties desirable in a hydraulic cement.

It will of course be understood that while a cement of pure mono-calcium, mono-strontium dialuminate has excellent properties, it is not necessary for many commercial purposes to have a pure compound of this analysis, but good hydraulic cements may be prepared in which other constituents are associated therewith providing there is sufficient of the mono-calcium, mono-strontium dialuminate to impart thereto its desirable properties. Furthermore, the ratio of the oxides may be varied within certain limits and still obtain cements having properties superior to those in the hydraulic cements of the prior art. In general, these limits, according to the preferred form of my invention, may be stated as follows in which the percentages referred to are mol. percent:

Where $Al_2O_3$ is 50% of the combined oxides of Sr, Ca and Al, the amount of SrO may vary between 20 and 40%; where $Al_2O_3$ is 55%, the SrO may be between 15 and 25%; where $Al_2O_3$ is 60%, the SrO may be between 10 and 30%, etc. When the $Al_2O_3$ falls substantially below 50% of the total, the strength of the resulting cements diminishes quite rapidly, and when it rises substantially above 60% the strength of the resulting cement also diminishes. However, when the ratios between the three oxides is within the limits above set forth, good cements are produced even when substantial amounts of other constituents are also present such as $SiO_2$, BaO, $Fe_2O_3$, MgO, and other constituents that are often found in cements.

While the preferred class of cements of my invention contains between 50% and 60% $Al_2O_3$, nevertheless in the broader aspects of my invention compositions are included outside of this range. Thus when $Al_2O_3$ is 40%, CaO may be varied between 20% and 55% and SrO correspondingly between 40% and 5% to produce cements of better than ordinary strength. Also when $Al_2O_3$ is 45%, CaO may be between 25% and 50% with SrO between 30% and 5%. When $Al_2O_3$ is 65%, CaO may vary from 15% to 30% with SrO between 20% and 5%. When $Al_2O_3$ is 70%, CaO may be between 10% and 25% with SrO between 20% and 5%. In all of these variations cements of good strengths and other properties are obtained. In all of these cements there is a sufficient and substantial amount of the compound mono-calcium, mono-strontium dialuminate present.

It is also to be understood that in the broader aspects of my invention where $Al_2O_3$ is 50%, 55% or 60%, SrO may be varied within somewhat wider limits than in the preferred ranges heretofore set forth, obtaining thereby cements of somewhat lower strengths.

It is to be understood that in commercial use of the cements of my invention, they are ordinarily mixed with sand or other material to form a mortar in the usual manner. Mortars formed with my new cements have a strength much higher than mortars formed with Portland cement, and when the cement used is within the preferred range consisting essentially of substantially pure mono-calcium, mono-strontium dialuminate, the mortar strengths are higher than can be obtained with any other hydraulic cement heretofore known.

My invention may be further illustrated by the following table showing specific examples which have been made, tested and found to be excellent hydraulic cements:

| Example | Mol. Percent Compositions |||
|---|---|---|---|
| | $Al_2O_3$ | CaO | SrO |
| 1 | 50 | 25 | 25 |
| 2 | 50 | 20 | 30 |
| 3 | 50 | 15 | 35 |
| 4 | 50 | 10 | 40 |
| 5 | 50 | 5 | 45 |
| 6 | 50 | 30 | 20 |
| 7 | 50 | 35 | 15 |
| 8 | 50 | 40 | 10 |
| 9 | 55 | 35 | 10 |
| 10 | 55 | 30 | 15 |
| 11 | 55 | 25 | 20 |
| 12 | 55 | 20 | 25 |
| 13 | 55 | 15 | 30 |
| 14 | 55 | 10 | 35 |
| 15 | 55 | 5 | 40 |
| 16 | 60 | 35 | 5 |
| 17 | 60 | 30 | 10 |
| 18 | 60 | 25 | 15 |
| 19 | 60 | 20 | 20 |
| 20 | 60 | 15 | 25 |
| 21 | 60 | 10 | 30 |
| 22 | 60 | 5 | 35 |
| 23 | 65 | 30 | 5 |
| 24 | 65 | 25 | 10 |
| 25 | 65 | 20 | 15 |
| 26 | 65 | 15 | 20 |
| 27 | 65 | 10 | 25 |
| 28 | 65 | 5 | 30 |
| 29 | 70 | 25 | 5 |
| 30 | 70 | 20 | 10 |
| 31 | 70 | 15 | 15 |
| 32 | 70 | 10 | 20 |
| 33 | 70 | 5 | 25 |
| 34 | 44.44 | 45.48 | 10.12 |
| 35 | 44.44 | 38.89 | 16.67 |
| 36 | 44.44 | 33.3 | 22.3 |
| 37 | 44.44 | 27.8 | 27.8 |
| 38 | 45.00 | 25.0 | 30.0 |
| 39 | 40 | 48 | 12 |
| 40 | 40 | 42 | 18 |
| 41 | 40 | 36 | 24 |
| 42 | 40 | 30 | 30 |
| 43 | 40 | 25 | 35 |
| 44 | 40 | 20 | 40 |
| 45 | 40 | 15 | 45 |
| 46 | 40 | 10 | 50 |
| 47 | 40 | 5 | 55 |

What I claim as my invention is:

1. A hydraulic cement comprising the finely divided heat-reaction product of the oxides of Al, Ca and Sr in such proportions as form a substantial preponderance of mono-calcium, mono-strontium dialuminate.

2. A hydraulic cement comprising a preponderance of mono-calcium, mono-strontium dialuminate.

3. Mono-calcium, mono-strontium dialuminate.

4. A hydraulic cement comprising the finely divided heat-reaction product of metal oxides including a substantial preponderance of the oxides of Ca, Sr and Al, the $Al_2O_3$ constituting from 50–60 mol. percent of the total of the $Al_2O_3$, CaO, and SrO and the SrO constituting from 10–40 mol. percent of said total.

5. A hydraulic cement comprising the finely divided heat-reaction product of 50–60 mol. percent $Al_2O_3$, 10–40 mol. percent SrO and the balance CaO.

6. A hydraulic cement comprising the finely divided heat-reaction product of 45–70 mol. percent $Al_2O_3$, 10–50 mol. percent SrO and 20–48 mol. percent CaO.

7. A hydraulic cement comprising the finely divided heat reaction product of the oxides of aluminum, calcium and strontium in such proportions as form a substantial preponderance of mono-calcium, mono-strontium dialuminate.

8. A hydraulic cement comprising the finely divided heat reaction product of approximately 50 mol. percent $Al_2O_3$, 25 mol. percent SrO and 25 mol. percent CaO.

9. A hydraulic cement comprising a finely divided heat reaction product of the oxides of calcium, strontium and aluminum, said product comprising at least 50% by weight of mono-calcium, mono-strontium dialuminate.

10. A hydraulic cement comprising a finely divided material containing at least 50% by weight of mono-calcium, mono-strontium dialuminate, said material being the heat reaction product of the oxides of aluminum, calcium and strontium in the following mol. proportions —45–70% $Al_2O_3$, 10–50% SrO and 20–48% CaO.

OSWALD T. ZIMMERMAN.

REFERENCES CITED

The following references are of record in the file of this patent:

UNITED STATES PATENTS

| Number | Name | Date |
|---|---|---|
| 2,304,391 | Zimmerman | Dec. 8, 1942 |